No. 707,206. Patented Aug. 19, 1902.
F. CHARRON & L. GIRARDOT.
BODY FOR MOTOR VEHICLES.
(Application filed Apr. 22, 1902.)

(No Model.) 2 Sheets—Sheet 1.

Witnesses:
E. B. Bolton
Thos. W. Aldous

Inventors:
Ferdinand Charron
Léonce Girardot
By Richard
their Attorneys

THE NORRIS PETERS CO., PHOTO-LITHO., WASHINGTON, D. C.

No. 707,206. Patented Aug. 19, 1902.
F. CHARRON & L. GIRARDOT.
BODY FOR MOTOR VEHICLES.
(Application filed Apr. 22, 1902.)
(No Model.) 2 Sheets—Sheet 2.
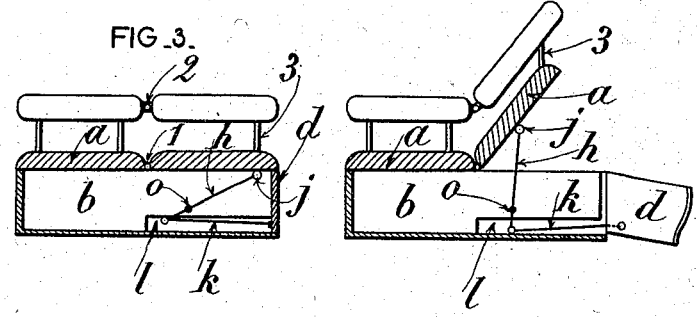
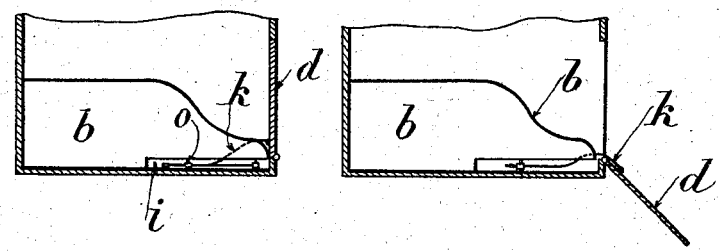

UNITED STATES PATENT OFFICE.

FERDINAND CHARRON AND LÉONCE GIRARDOT, OF PARIS, FRANCE.

BODY FOR MOTOR-VEHICLES.

SPECIFICATION forming part of Letters Patent No. 707,206, dated August 19, 1902.

Application filed April 22, 1902. Serial No. 104,096. (No model.)

*To all whom it may concern:*

Be it known that we, FERDINAND CHARRON and LÉONCE GIRARDOT, citizens of the Republic of France, residing at 45 Avenue de la Grande Armée, Paris, in the Republic of France, have invented a certain new and useful Improved Body for Motor-Vehicles, of which the following is a specification.

Our invention relates to an improved body for motor road-vehicles which provides for all the desirable comfort in this class of vehicles. With this construction aged persons or ladies can mount on the carriage with the greatest facility, and when the riders are installed in the carriage they have not to fear the eventual opening of the doors during the motion, as it can happen in the carriages in which the door is at the back.

The essential feature of our improved body is that the entrance is at the side and that the opening of the door produces the automatic lifting of one of the front seats or driver's seats, so as to leave a large free passage to the person who mounts on the carriage without it being necessary to augment the length of the carriage.

Figure 1:
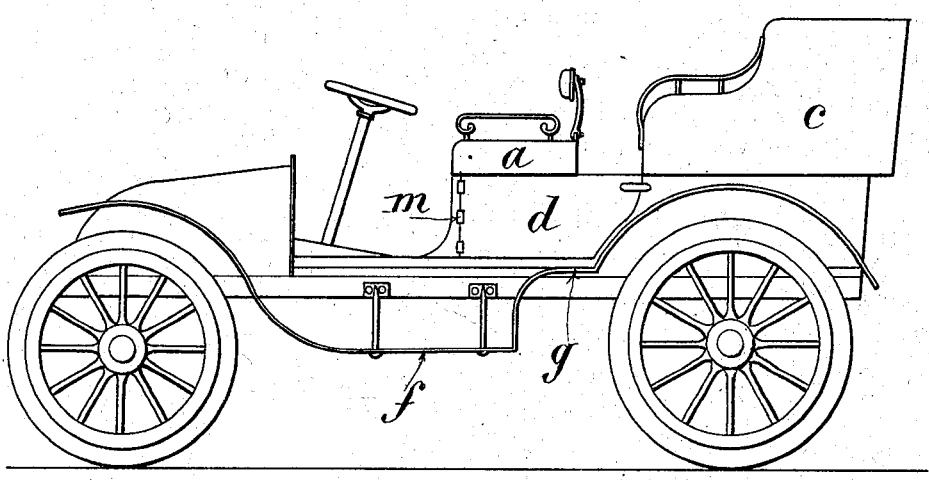
Figure 2:
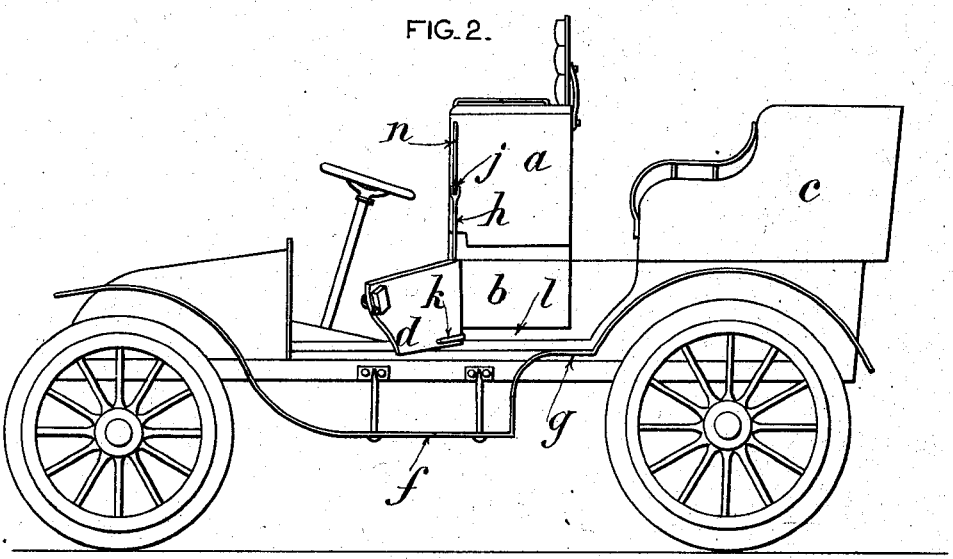

In the accompanying drawings, Figure 1 is a side view of a motor-carriage provided with our improved body, the carriage being represented in its normal position—that is to say, with its door closed. Fig. 2 is a similar view, the door being opened. Figs. 3 to 6 are diagrammatic views showing the transmission of motion from the door to the seat. Figs. 3 and 5 are vertical sectional views, the door being respectively closed and then opened; and Figs. 4 and 6 are corresponding horizontal sectional views.

Our improved body comprises, as usual, the driver's seat $a$, beneath which is placed the petroleum-reservoir $b$. Behind this first seat is arranged at $c$ the rotunda-seat, which is entirely closed sidewise and at the back, which affords for the riders all the desired comfort. The door $d$ is placed at the side of the driver's seat $a$. When this door is opened, a part of the seat is caused to lift automatically, which affords an easy access to the back part of the carriage. As seen in Fig. 1, the rider steps his foot first on the tread $f$, which is very low, then on the intermediate step $g$, and enters without any difficulty in the carriage. The lifting up of the seat $a$ when the door is opened and its letting down when the door is closed are obtained in the following manner: The movable part of the seat is hinged on the stationary part at 1. Likewise the movable back is hinged at 2 on the stationary back, and the jamb 3, which connects the movable part of the seat to its back, is pivoted to these parts instead of being rigidly connected thereto. A lever $h$, arranged underneath the movable part of the seat, is free to oscillate on a stationary horizontal axle $o$, secured to the wall of the reservoir. This lever, which moves in a vertical recess $i$ provided in the reservoir, carries at the end of its long arm a roller $j$, and it is pivoted at the end of its small arm to a bent rod $k$, which is pivoted at its other end to the door $d$. This rod is free to move in a recess $l$, provided underneath the reservoir. When the door is closed, as shown in Figs. 3 and 4, the lever $h$ stands in a very inclined position, and its roller $j$ is in contact with the bottom of the seat $a$, but near its edge. If the door is opened, it will pull, while pivoting on its hinge $m$, the rod $k$, which in turn will pull the small arm of lever $h$. This lever is then caused to oscillate around the axle $o$ and its long arm lifts up the seat $a$ by means of the roller $j$, which runs on the bottom of said seat, where a metallic path $n$ has been provided. When the door is entirely opened, the pivoting-point of rod $k$ on said door being at the back of the hinge of the door, as shown in Fig. 6, the strain exerted on the rod by the weight of the seat cannot cause any more the door to pivot in the opposite direction, so that the door remains open by itself and the seat lifted up. If the door is closed, the contrary movements are produced, and the seat is let gradually down, leaning constantly on the roller $j$. With this arrangement much space can be spared, because the rotunda-seat can be very near to the driver's seat, and, besides, a very easy access to the carriage is provided for. Besides, our carriage allows of having a passage free for the riders, though the petroleum-reservoir may extend through the whole breadth of the carriage, as seen in Figs. 5 and 6, which is not possible in the carriages where the rider has to lift entirely the front seat to pass to the back.

Having now particularly described and ascertained the nature of our said invention and in what manner the same is to be performed, we declare that what we claim is—

1. A body for motor road-vehicles with a back rotunda-seat arranged at the back part *c* of the carriage, closed at the sides and at the back, in combination with a front seat or driver's seat *a* one part of which can be lifted sidewise by pivoting on the stationary part, in combination with a door *d* arranged at the side of the movable part of the seat *a*, and in combination with a lever *h* arranged beneath the movable part of the seat and pivoted to a stationary point *o* intermediate of its length and with a bent rod *k* pivoted by one end to the small arm of the lever *h* and by the other end to the door *d*, near the hinge thereof substantially as and for the purpose set forth.

2. A body for motor road-vehicles with a back rotunda-seat arranged in a part *c* of the carriage, closed at the sides and at the back, in combination with a front seat *a* made of two parts, one stationary and the other movable and pivoted to the stationary part, in combination with a petroleum-reservoir *b* arranged beneath the seat *a* and provided with a vertical recess *i* and a horizontal recess at the under part *l*, in combination with a door *d* arranged at the side of the movable part of the seat *a*, in combination with the lever *h* pivoted at *o* to the wall of the reservoir *b*, located in the recess *i* and carrying at the end of its long arm a roller *j* which bears constantly against the bottom of the movable part of the seat *a* and rolls on the way *n* when the seat is raised or lowered, in combination with a bent rod *k* located in the recess *l* and pivoted by one end to the small arm of the lever *h* and by the other end to the inner surface of the door at a certain distance from the hinge, substantially as and for the purpose set forth.

In witness whereof we have hereunto set our hands in presence of two witnesses.

FERDINAND CHARRON.
LÉONCE GIRARDOT.

Witnesses:
ANTOINE LAVOIX,
EDWARD P. MACLEAN.